May 17, 1938. R. M. HICKS ET AL 2,117,804
DECODER AND REGENERATIVE REPEATER
Original Filed Jan. 27, 1932 10 Sheets-Sheet 1

INVENTOR
RAYMOND M. HICKS
EVERETT R. LEROY
BY Ward, Crosby & Neal
ATTORNEYS

May 17, 1938.  R. M. HICKS ET AL  2,117,804
DECODER AND REGENERATIVE REPEATER
Original Filed Jan. 27, 1932  10 Sheets-Sheet 6

INVENTOR
RAYMOND M. HICKS
EVERETT R. LEROY
BY
Ward, Crosby & Neal
ATTORNEYS

May 17, 1938.  R. M. HICKS ET AL  2,117,804
DECODER AND REGENERATIVE REPEATER
Original Filed Jan. 27, 1932  10 Sheets-Sheet 7

Fig. 10

Patented May 17, 1938

2,117,804

UNITED STATES PATENT OFFICE 2,117,804

DECODER AND REGENERATIVE REPEATER

Raymond M. Hicks, Plainfield, N. J., and Everett R. Leroy, New York, N. Y., assignors to The Teleregister Corporation, New York, N. Y., a corporation of Delaware Application January 27, 1932, Serial No. 589,084
Renewed December 14, 1935

13 Claims. (Cl. 177—353)

This invention relates to a decoder and regenerative repeater, and this application is a continuation in part of our application Ser. No. 506,182, filed January 2, 1931.

Among the objects of this invention is the provision of mechanism which may be located at a central transmitting station, or at any distant point if desired, for receiving characters of a five unit code over one wire and retransmitting them as a four unit code over one wire, and for receiving characters of a four unit code and storing them, and retransmitting them at the proper time.

Another object of the invention is the provision of such mechanism for receiving characters of a five unit code over one wire and retransmitting them as a four unit code over four wires, and for the purpose of storing and retransmitting at the proper time four unit code signals.

Another object of the invention includes the combination of decoding, recoding and retransmitting mechanisms adapted to receive characters of the five unit code and four unit code over one wire, and to retransmit them as a four unit code over one wire and over four wires.

Another object of this invention is the provision of mechanism for retransmitting special information which, in the mechanism disclosed, is received as a five unit code over one wire and is retransmitted without any change in the code.

Another object of the invention is the provision of means for predetermining a sequence of channels and for retransmitting the proper coded information for selecting such channels.

Other objects of the invention will appear to those skilled in the art after the specific embodiments illustrated and described for the purpose of disclosure are understood.

With these and other objects in view the invention may consist of the mechanism set forth in the following description taken in connection with the drawings, in which.

In Teleregister systems of the character to which this invention may relate, information relating to various stocks such as the stock abbreviation, range, and the price of the stock, are set up on a keyboard in the central station, and as is the practice now, are transmitted over a plurality of lines to various indicator boards located in brokers' offices in the city in which the transmitting station is located. This system including a plurality of line channels, usually four in number, could be extended to give the same service to brokers in distant cities. In order to cut down expense it is our object to transmit all stock information from one city to a distant city over a one line channel where receivers may be provided to be operated directly from the one line channel, or where a central decoding mechanism may be provided to convert the code received into any code to which the receiver installations are responsive, or where a regenerative mechanism may retransmit the code received over four line wires.

In the mechanism to which the invention is applied, the transmitter sends out the information over one wire, the stock abbreviation being sent as a five unit code, the preferred information as a two unit code, and the remainder of the information, such as range and price, as a four unit code. It is desirable, however, to use a four unit code and for this purpose a decoding mechanism is provided in the transmitting station for converting the five unit code and/or the two unit code for the preferred into a four unit code, and for transmitting such four unit code over a single wire to a distant city and over four wires to local receivers.

Figure 1:
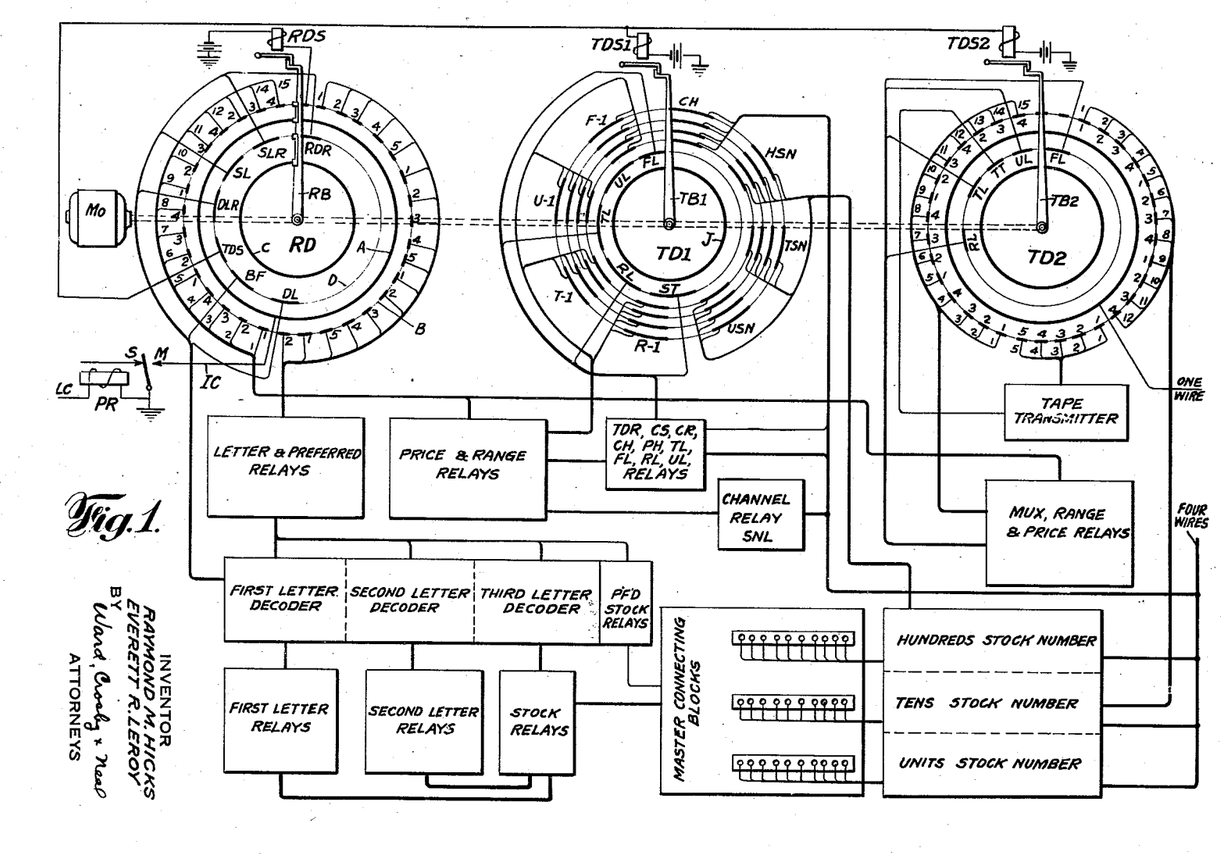
Fig. 1 shows a schematic arrangement of a receiving, recoding and retransmitting mechanism.

As shown in Fig. 1, in the line channel LC connecting the central transmitting mechanism to the decoder mechanism is incorporated the line relay PR. In systems now known, for example, as disclosed in Patent No. 2,010,158 to Kleinschmidt, issued August 6, 1935, the relay PR is normally energized and the information is transmitted by interrupting the circuit energizing this relay. As the relay PR is deenergized it applies ground over its contact to the incoming line IC which transmits resultant impulses over the brush RB of the receiving distributor RD, the first of which impulses operates the distributor start magnet RDS, which releases the brush RB. The mechanism also includes a pair of resending distributors, a four wire retransmitting distributor TD1, and a one wire retransmitting distributor TD2. These distributors are provided with brushes TB1 and TB2 which are released respectively by the starting magnets TDS1 and TDS2, a parallel circuit over which is closed by the receiving distributor brush RB at the proper time. All of the distributors RD, TD1 and TD2 may be driven from a constantly operating motor Mo through slip clutch connections, not shown, so that the brushes RB and the pair of brushes TB1 and TB2 will be operated whenever the starting magnet RDS and the starting magnets TDS1 and TDS2 are energized.

All the information relating to a stock such as the stock letter abbreviations, whether it is first preferred or second preferred, the range, the tens price, the units price and the fractions price, may be transmitted by a total of thirty-two impulses over the line LC. For this purpose, the receiving distributor RD is provided with thirty-two segments over which such information is received and stored in relays wire to these segments. The letter information which is received as a five unit code controls decoding relays which convert the letter information into number information as a four unit code. In the case of preferred stocks, the numerical designation of the stock is changed. The range and price information which is received as a four unit code is routed into relays which control the retransmission of such information as a four unit code.

Under control of stock number and range and price storage relays the information is transmitted by the distributor TD1 as a four unit code over four wires, and by the distributor TD2 as a four unit code over one wire.

Segments on the transmitting distributor TD2, made available because of retransmission as a four unit code, may be used for transmitting any desired special information, and if desired the transmission of this special information may be controlled by a tape transmitter which comes into operation to transmit one letter upon each rotation of the distributor TD2.

Figure 2:
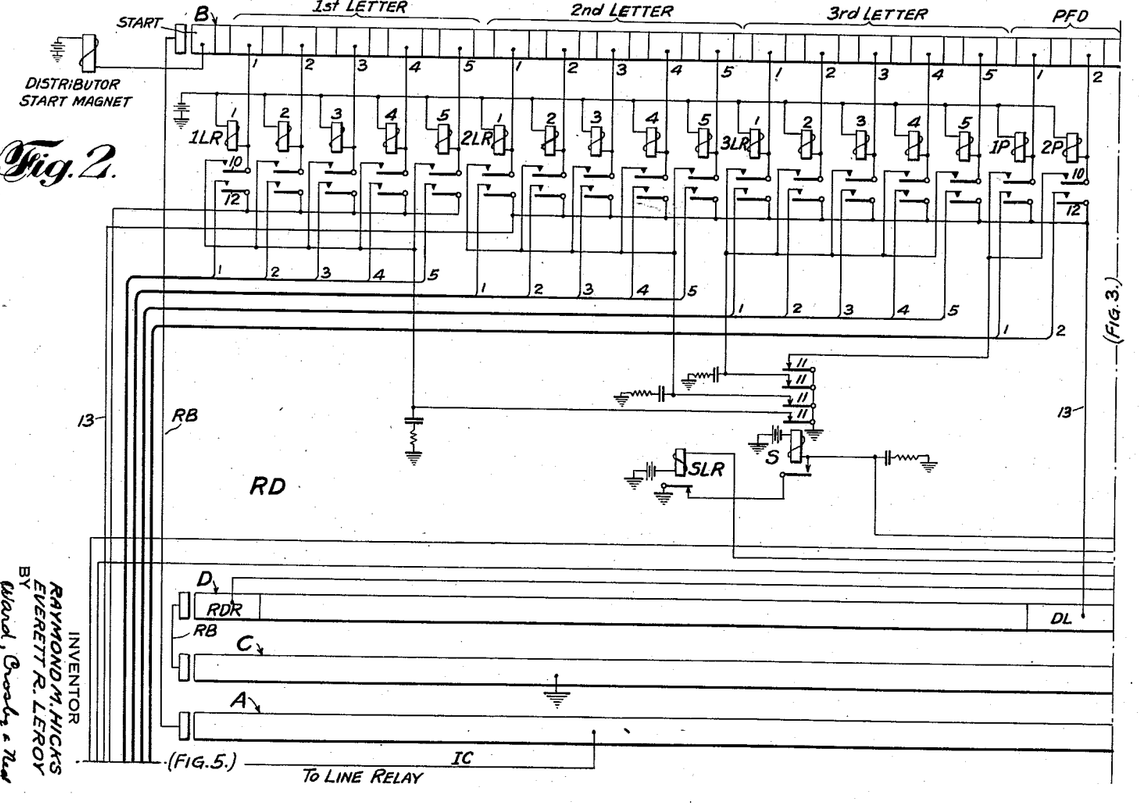
Figs. 2 and 3 taken together show a development in plan of a receiving distributor and storage relays controlled thereby.
Figure 3:
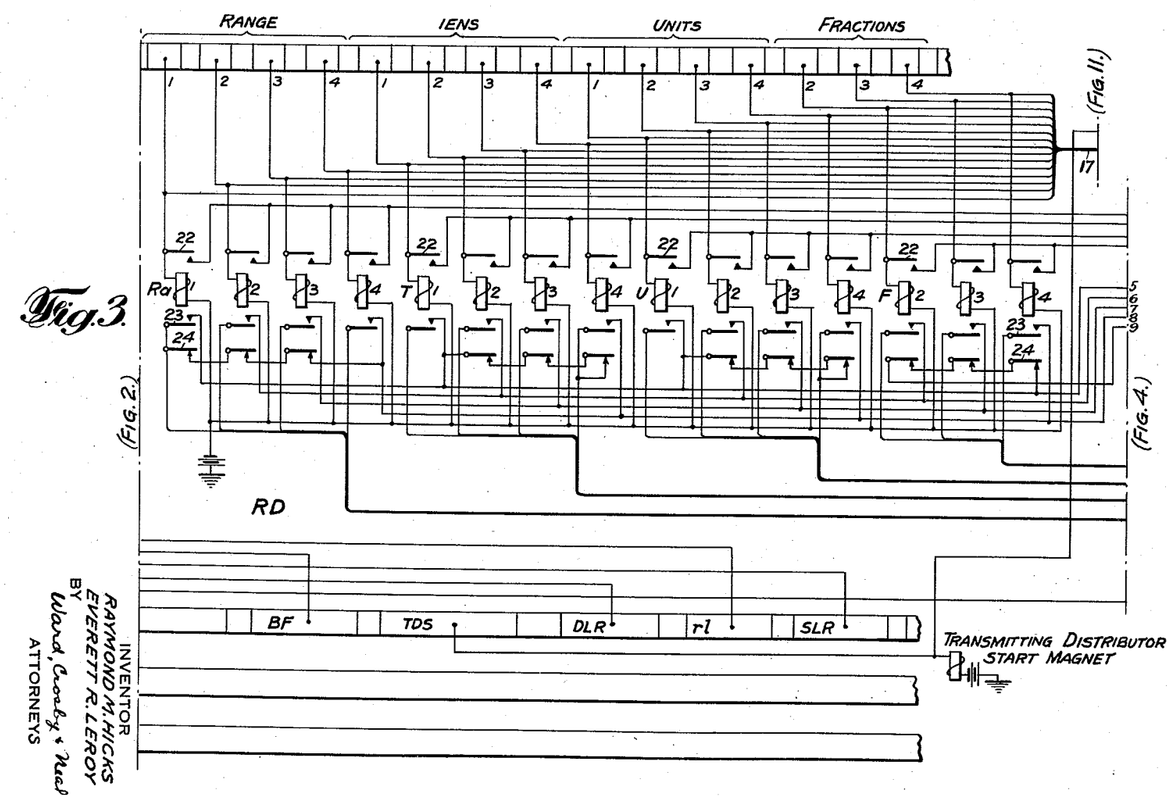

By reference to Figs. 2 and 3, in which the receiving distributor RD is developed in a plane, it will be seen that the distributor comprises rings A, B, C, and D, of which the ring A is connected to the incoming line IC and is adapted to be connected by the brush RB to the various segments on the ring B. The ring C is normally grounded and is adapted to be connected by brush RB to various segments of the ring D for purposes later set forth.

With the parts in the position shown in Figs. 2 and 3, ground applied on the line IC is extended over the start segment of the ring B to the receiving distributor and starting magnet RDS, which operates and releases the brush RB for one cycle operation. The ring B includes, in addition to the start segment, thirty-two segments, the first five segments being allotted to the first letter of the stock abbreviation, the next five to the second letter, the next five to the third letter, the next two to first and second preferred, the next four to the range, the next four to the tens, the next four to the units, and the last three to the fractions.

If the brush RB, Fig. 1, is grounded over the marking contact M, as it is in contact with the segment 1 for the first letter, it will complete the circuit for the relay 1LR bearing the numeral 1 causing this relay to be energized. As the relay 1LR is energized it closes a holding circuit over its make contact 10, and a contact 11 of the release relay SL, to ground. At its contact 12 it prepares a circuit which is adapted later to be completed under control of the segment DL of the ring D. This circuit extends over the coil of the first letter decoding relay 1LD, marked 1, Fig. 5, and to battery and ground.

Figure 5:
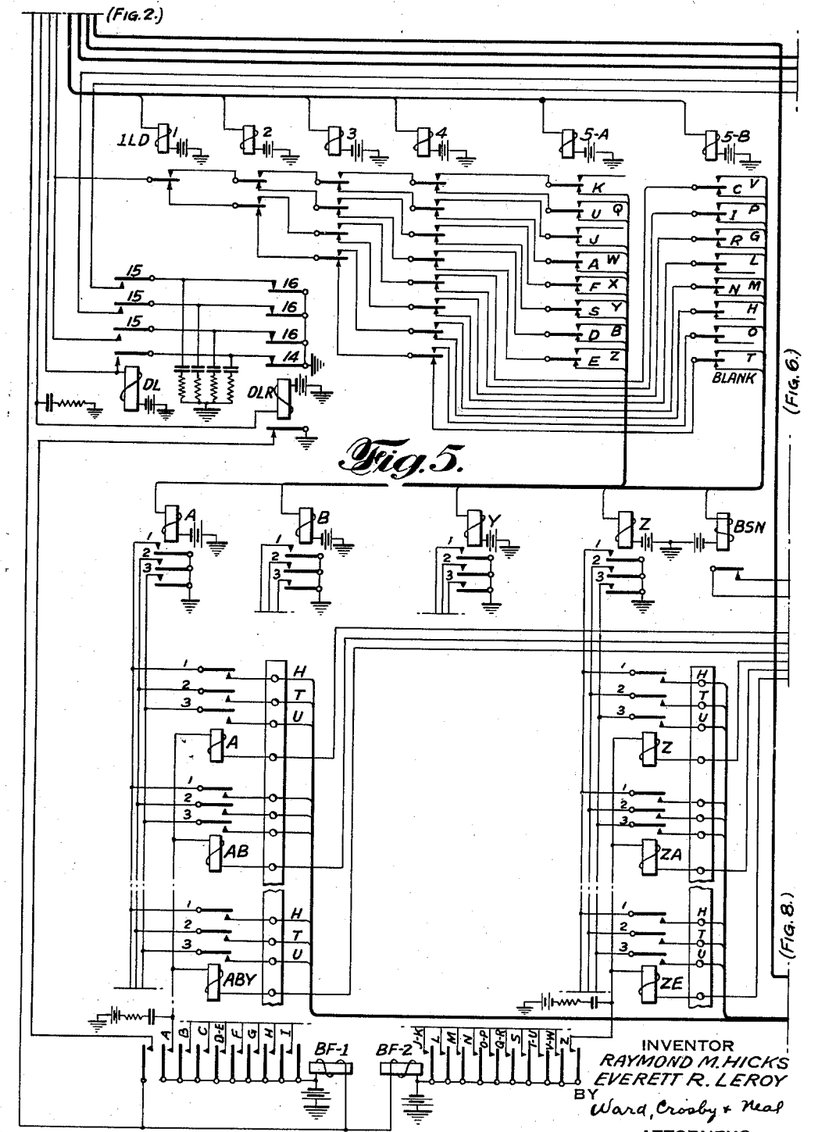
Fig. 5 shows the first letter decoding relays, some of the first letter controlling relays, and a part of the stock relay circuit.

If the distributor arm is grounded as it passes over segment 2 for the first letter, it will cause the relay 1LR, marked 2, to pick up and lock over a contact 11 of the relay SL and prepare a circuit over its contact 12 to the coil of the first letter decoding relay 1LD, designated 2, in Fig. 5. If the distributor arm is grounded as it passes over segments 3, 4, and 5 it will cause circuits to be prepared to the coils of the first letter decoding relays 1LD, designated 3, 4 and 5—A and 5—B, respectively. It is desirable to employ two relays 5, designated 5—A and 5—B, instead of a single relay 5 in view of the large number of contacts to be closed.

As the brush passes over the various second and third letter segments, it will cause various combinations of relays 2LR and 3LR to pick up and to lock over the contacts 11 of the relay SL, and to prepare circuits from the line 13 from the segment DL to the corresponding second letter and third letter decoding relays which in all respects are the same as the first letter decoding relays shown in Fig. 5.

Figures 8, 9:
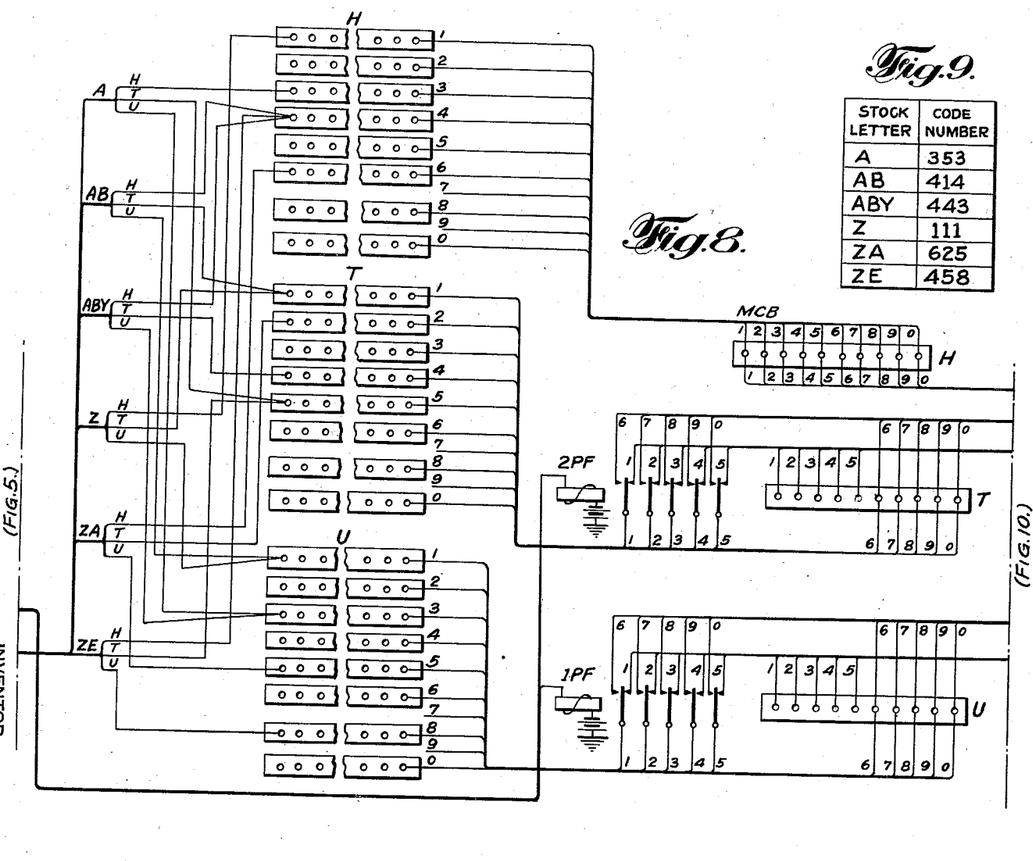
Fig. 8 shows the master connecting block arrangement, together with the preferred relays and the multiple blocks used for cross connecting from the stock relays shown in Fig. 5.
Fig. 9 is a typical cross connection table for converting stock abbreviations into code numbers.

As the distributor brush passes over the segments 1 and 2 of preferred, the relays 1P and 2P may pick up and lock over a contact 11 of relay SL and prepare circuits from the line 13 to the preferred relays 1PF and 2PF, Fig. 8.

As the distributor arm RB connects ground to the segment DL of the ring D, Fig. 2, it grounds the line 13 which completes the circuit prepared over the contacts 12 of the second and third letter and preferred storage relays, closing the circuits for the corresponding second, third letter decoding relays and preferred relays, and for the relay DL, Fig. 5, which locks to ground over a contact 14 of relay DLR. The relay DL at its contacts 15 extends ground on contacts 16 of relay DLR, over the contacts 12 of the first letter storage relays to operate the first letter decoding relays, and supplies ground-in over the contacts of the first, second and third letter decoding relays. As the first letter decoding relays, Fig. 5, pick up they extend ground on the incoming line, across their various contacts, as indicated in Fig. 5, to lines with which the letters of the alphabet are associated, and to a blank line. These lines are connected to the first letter controlling relays A to Z, and to a blank stock number relay BSN. As one of the controlling relays picks up it connects ground over its contacts to lines which are parallel to the contacts of all the stock relays A, AB and ABY, etc. corresponding to stocks having the single letter A, or two letter stocks having the first letter A, or three letter stocks having the first letter A. This same construction is also indicated in connection with the first letter controlling relay Z and stock relays Z, ZA, and ZE. Ground, over contacts 16 and 15 of relays DLR and DL on the ground-in lines, extends across the various contacts of the second and third letter decoding relays 2LD and 3LD to lines with which the letters of the alphabet are associated, as in the case of the first letter decoding group, Fig. 5. The ground across the second letter decoding group 2LD is extended to the ground terminal of the corresponding second letter controlling relays, Figs. 6 and 7, which connect the grounded lines from the third letter decoding relays across their contacts, as indicated in these figures.

When the stock is a one letter stock, such as the letter A, the controlling relay A in Fig. 5 will pick up and connect ground over its contacts to three lines which are multipled to all of the armatures of the stock relays whose designation begins with the letter A. As there is but one letter in the designation, the lines designated blank from the second and third letter decoding relays will be grounded, the blank line from the second letter decoding relays 2LD being connected across the contact of the blank relay BSN to the winding of the (—) relay, Fig. 6, which connects ground on the blank lead from 3LD to one side of the coil of the stock relay A, which will be completed when the relay BF, Fig. 5, is energized. The relay BF will be energized when the brush BR, Fig. 2, grounds the segment BF, Fig. 3, and when this occurs the particular stock relay to which a ground circuit has been prepared across the decoding relays will extend ground connected across the contacts of the energized controlling relay associated with the first letter decoding relays to the multiple terminal blocks, Fig. 8, and, in the particular instance in which the stock A is selected, to the blocks H3, T5 and U3, the lines H, T and U from the stock relay A being arbitrarily connected to these blocks as indicated by the table in Fig. 9. Ground from these blocks will be extended across the master connection blocks MCB at the right of the Fig. 8, corresponding lines of which are connected to one side of the windings of the stock number relays, Fig. 10, which are designated HSN, TSN and USN, the digit value of which is indicated by the numerals associated with the relays.

When a one letter stock is received a combination of relays 1, 2, 3, 4 and 5—A and 5—B in group 1LD, Fig 5, is operated and establishes a circuit to one of the first letter relays A, B, etc., Y and Z, any one of which when operated applies ground to three lines which are multipled across the contacts of all single letter, two letter and three letter stock relays having a first letter corresponding with the selected first letter. As this is a one letter stock, and assuming that it is a stock designated A, no relays will be pulled up in groups 2LD and 3LD, Fig. 6, with the result that circuits will be established over the contacts of these groups of relays to the "blank" lines. Ground on the blank line coming out of the second letter group 2LD pulls up the relay marked (—), Fig. 6, which connects ground on the blank line coming out of the third letter group 3LD to lines which operate the single letter stock relays, such as A and Z shown in the lower section of Fig. 5. As ground has been applied by the first letter relay A to the contacts of the stock relay A, these grounds will be extended over the lines H, T, U, Fig. 5, which in Fig. 8 are cross-connected to the multiple connection blocks H, T, U, where they are extended over digit lines 1 to 0 which, as shown in Fig. 9 for stock letter A, are lines 3, 5, and 3. These lines, 3, 5, and 3 are connected through the master connection blocks MCB, Fig. 10 8, to the corresponding stock number relays, Fig. 10, in the hundreds, tens and units groups, causing the energization of the relay 3 in the hundreds stock number group HSNR, relay 5 in the tens stock number group TSNR, and the relay 3 in the units stock number group USNR.

Figure 6:
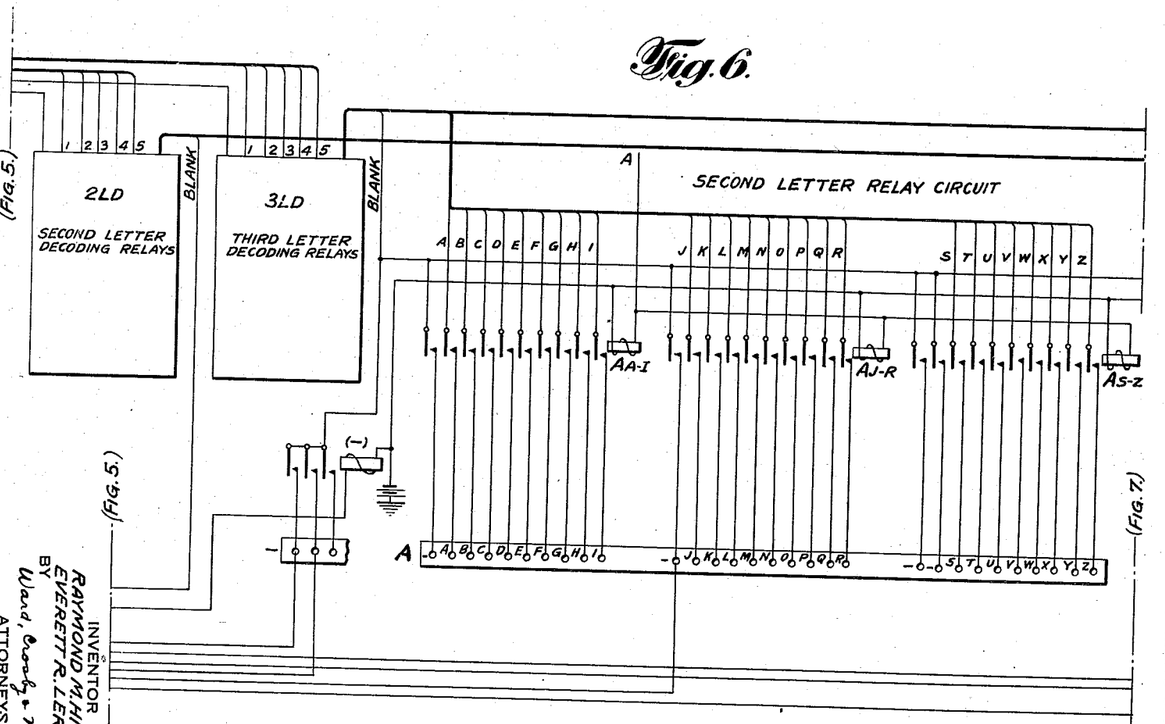
Fig. 6 shows a diagrammatic indication of the second and third letter decoding relays, and the second letter relay circuit.

In the case of a two letter stock, for example, AB, the first letter relay A, Fig. 5, is energized under the control of group 1LD the same as in the case for the one letter stock A. The group of relays 2LD, Fig. 6, are then energized in combination to close a circuit across a line B coming out of this group which energizes relays B(A–I), B(J–R) and B(S–Z), Fig. 7. These relays close contacts to the connecting block B. As the stock designation does not involve a third letter the third group of relays 3LD will not operate and ground-out on the blank line, Figs. 6 and 7, will be extended over the blank terminal of block B, Fig. 7, and across Fig. 6 to one terminal of the stock relay AB which will be energized by the relay BF—1, when the relay BF—1, Fig. 5, is operated. Operation of the stock relay AB extends ground from the first letter relay A over the cross-connection wires to the multiple connection blocks, Fig. 8, to represent the stock by the number 414. These circuits extend across the master connection blocks MCB to operate the stock number relays, Fig. 10. This causes the relay 4 in the hundreds stock number relays HSNR, the relay 1 in the tens stock number relays TSNR and the relay 4 in the units stock number relays USNR to pull up.

Figure 7:
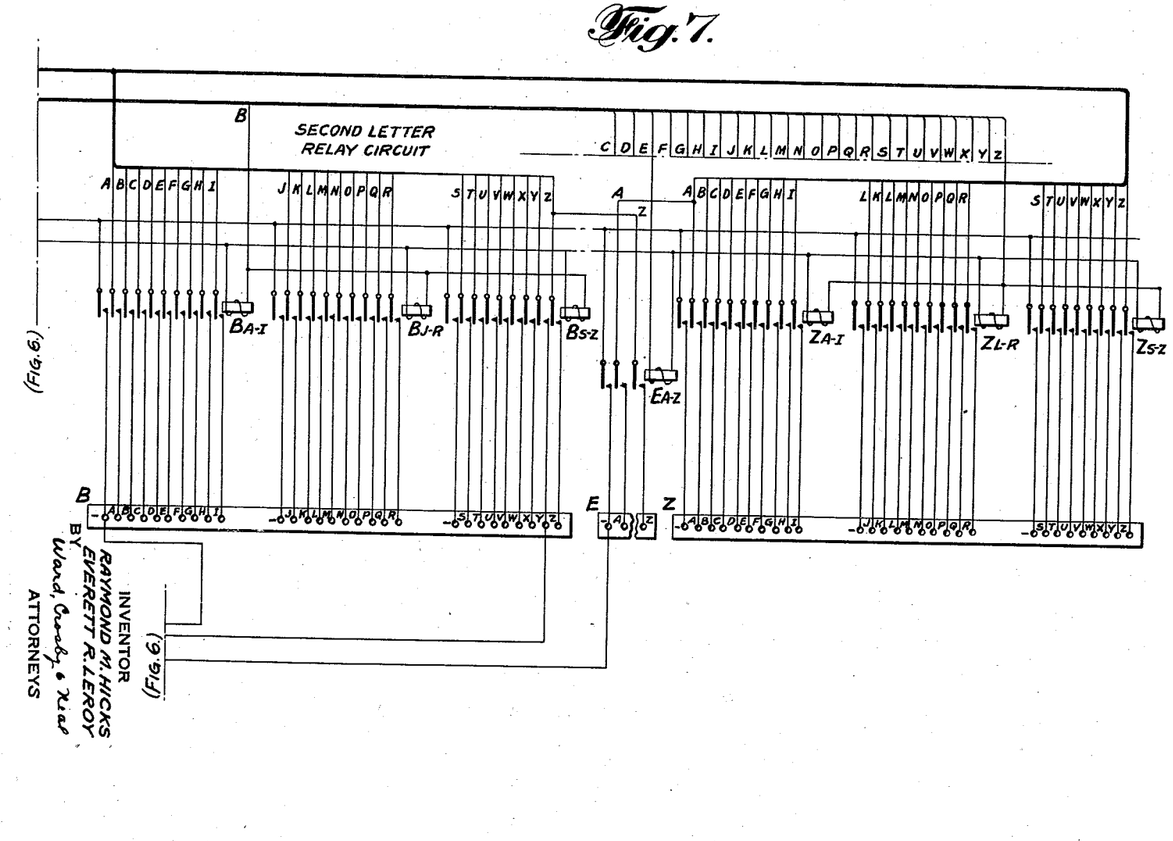
Fig. 7 is an extension of the second letter relay circuit shown in Fig. 6.

For a three letter stock, relays in each of the groups 1LD, 2LD and 3LD will be operated in various combinations. For the stock designated ABY, relays in groups 1LD and 2LD will be operated as in the case of the two letter stock AB. The third letter group 3LD will be controlled to apply ground on the lead Y, leading out of this group which, as shown in Fig. 7, is extended across the contact of the relay B(S–Z) to the Y terminal of block B. Ground is then extended across Fig. 6 to one terminal of the stock relay ABY, Fig. 5, which will operate upon operation of the relay BF—1. Operation of the relay ABY extends ground from the contacts of the first letter relay A across the lines H, T, U cross-connected to the multiple connection blocks H, T, U, Fig. 8, to represent the number 443. These lines are extended to the master connection blocks MCB and thence to the stock number relays in Fig. 10 where they operate the relay 4 of the hundreds stock number group HSNR, the relay 4 of the tens stock number group TSNR, and the relay 3 of the units stock number group USNR.

For each of the second letters of the stock abbreviation there is a group of relays shown in Figs. 6 and 7. The relays in each of these groups operate in multiple, the object of division being to facilitate the handling of a large number of contact springs.

If the stock is a first preferred stock, the relay 1PF, Fig. 8, will be energized and the units digit of the stock numbers 1, 2, 3, 4, and 5 will be increased by five to 6, 7, 8, 9, and 0. If the stock is a second preferred stock, the tens digit will be increased by five as indicated by the numbered contacts associated with the second preferred relay.

If, as assumed before, the stock designated A is involved, to which arbitrarily the number 353 has been assigned, and if it is a common stock, then the ground will be extended to the windings of the relays 3, 5 and 3 in the groups HSN, TSN and USN. If information is to be transmitted, as to the first preferred of stock A, the relays 3, 5 and 3 in these respective groups will be picked up. If information is to be transmitted as to the second preferred of stock A, the relays 3, 9 and 3 in these groups will be picked up. These relays will pick up immediately after ground has been extended to one side of the windings, in series with relay ST, Fig. 4, which prepares a circuit from battery over the winding of relay SNL and over its contact to a segment ST of the retransmitting distributor, Fig. 4, for purposes which will be described later.

As the brush RB continues its movement it applies ground to the segment TDS, which operates the transmitting distributor start magnet, which will be referred to later. As the brush continues its movement it applies ground to the segment DLR which causes the relay DLR, Fig. 5, to pick up and at one of its contacts to remove ground from the circuit of the relays BF—1 and BF—2, causing these relays to deenergize, which in turn opens the energizing circuit of the stock relays, Fig. 5. The stock number relays and the ST relay will be held up over contacts 26 of the stock number relays and a contact of relay RL, Fig. 4, to ground. Relay DLR at other of its contacts removes ground from the lines which extended over the contacts of the first, second and third letter relays, causing the release of the controlling relays associated with the first, second and third letter decoding relays and causing also the relay DL to release.

As the brush continues it grounds the segment r1 of the ring D, which causes the relay S, Fig. 2, to pick up and to release all of the letter and preferred relays in Fig. 2. The S relay locks over its own contact and a contact of the SLR relay to ground. As the brush continues it moves into contact with the segment SLR of the ring D, which causes the relay SLR to pick up, which in turn causes the S relay to release, thus applying ground to the holding circuits for the storage relays in Fig. 2, so that they may receive information as to another stock. The relay SLR is released as the brush leaves the segment SLR, after which all of the relays in Figs. 2 and 3 are released. As the brush continues its movement into its home position it moves into contact with the channeling segment RDR, which energizes the relay CH, Fig. 4, for purposes that will be described later.

Figure 4:
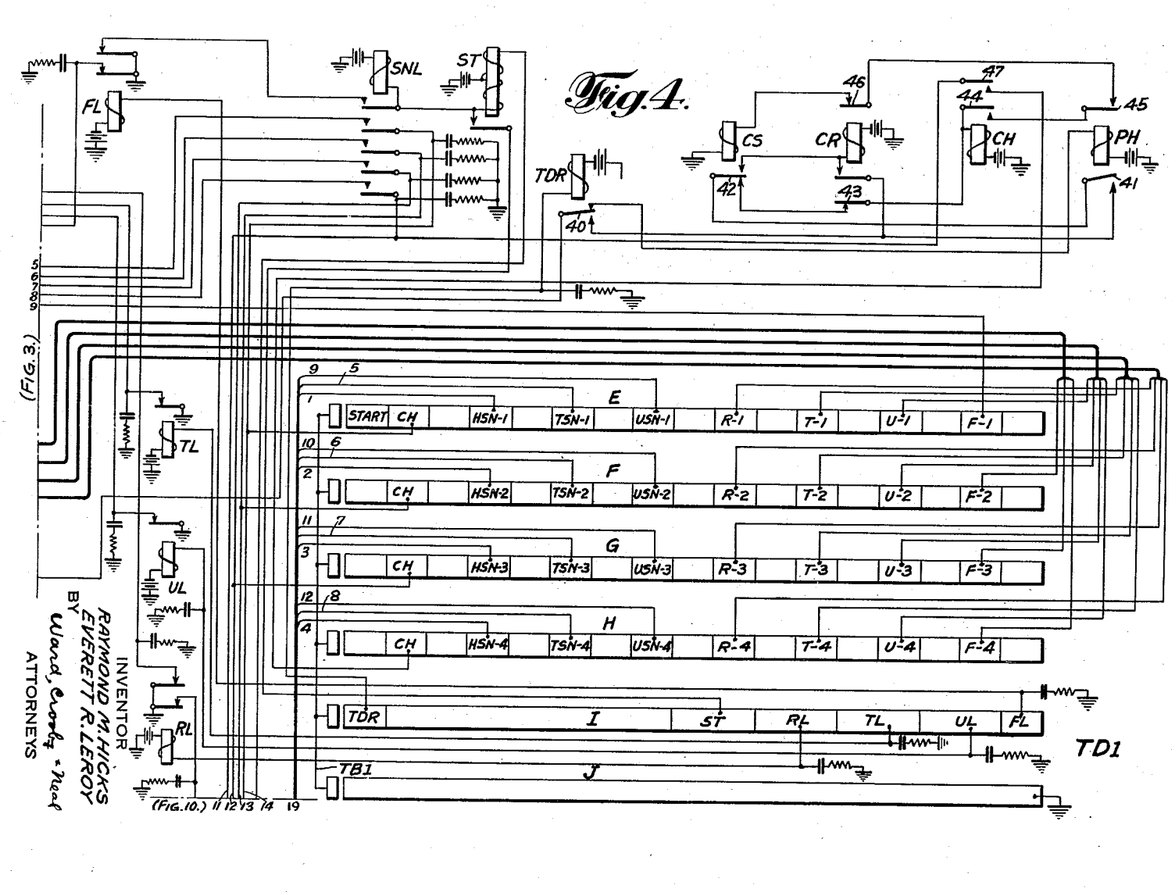
Fig. 4 shows a development in plan of a local four wire retransmitting distributor, and channeling, phasing and release relays.

After the brush has received and distributed the information as to the stock abbreviation, and as to whether the stock is first, second or preferred, it travels over the range segments and pulls up the range relays Ra which lock up over their contacts 22 and over a contact of relay RL, Fig. 4, to ground. As the brush travels over the segments for the tens price it pulls up the tens relays T which lock over their own contacts and a contact of the relay TL, Fig. 4, to ground. In a similar manner the units relays U are picked up over the unit segments and lock to ground over a contact of the relay UL, Fig. 4, and the fractions relays F pick up and lock over their own contacts and a contact of relay FL, Fig. 4, to ground. Various range, tens, units and fractions storage relays are locked to ground over contacts of different relays so that they may be released by the retransmitting distributor TD1 at the proper time during the retransmission operation.

The relays in Fig. 3 at their contacts 23 prepare various circuits from the distributor TD1 to the outgoing four line wires, and open normally closed circuits at their contacts 24, which will be referred to later. The lines from the range, tens, units and fractions segments, with which the numerals 1, 2, 3 and 4 and 2, 3 and 4 are associated, are cabled at 17 and extend to the auxiliary relays in Fig. 11.

The four wire four unit code distributor TD1, which is shown developed in a plane in Fig. 4, includes segmented rings E, F, G, H and I which are adapted to be connected to ground by the brush TB1 through the ring J which is normally grounded. Each of the rings E, F, G and H includes hundreds stock number segments which are designated HSN—1, HSN—2, HSN—3, HSN—4. When the brush TB1 connects the segments with the ring J ground will be connected to the lines 1, 2, 3 and 4 of the cable 19 which, in Fig. 10, are adapted to be connected across the upper contacts of the hundreds stock number relays HSNR, which have been energized to four outgoing lines 11, 12, 13, and 14, which may extend to repeating relays, shown in the application herein referred to, for applying impulses to four line wires going to local receiving stations.

As the brush moves over the segments TSN—1, TSN—2, TSN—3 and TSN—4, ground is connected across the corresponding contacts of the tens stock number relays TSNR, Fig. 4, and to said lines 11, 12, 13 and 14 operating the repeating relays, as before, and as the brush moves over the units stock number segments USN—1, USN—2, USN—3 and USN—4, ground is applied across the corresponding closed contacts of the units stock number group USNR, Fig. 4, to the lines 11, 12, 13 and 14 causing the transmission on the four outgoing lines of a four unit code designating the units stock number.

If it is assumed that information has been received as to the stock A, then according to the chart shown in Fig. 9, and as before explained, the relay 3 in the hundreds stock number group HSNR will be energized, the relay 5 in the tens stock number group TSNR, and the relay 3 in the units stock number group USNR. As the brush TB1, Fig. 4, grounds the hundreds stock number segments HSN—1, HSN—2, HSN—3 and HSN—4, ground will be applied to the lines 1, 2, 3 and 4 in cable 19. As the relay 3 in the hundreds stock number group HSNR is energized ground on lines 1 and 4 will be extended across the contacts 25 of the relay 3 to lines 14 and 11 which, as indicated at the right hand side of Fig. 10, extend to repeating relays to transmit ground impulses on two of the four outgoing wires.

Figure 10:
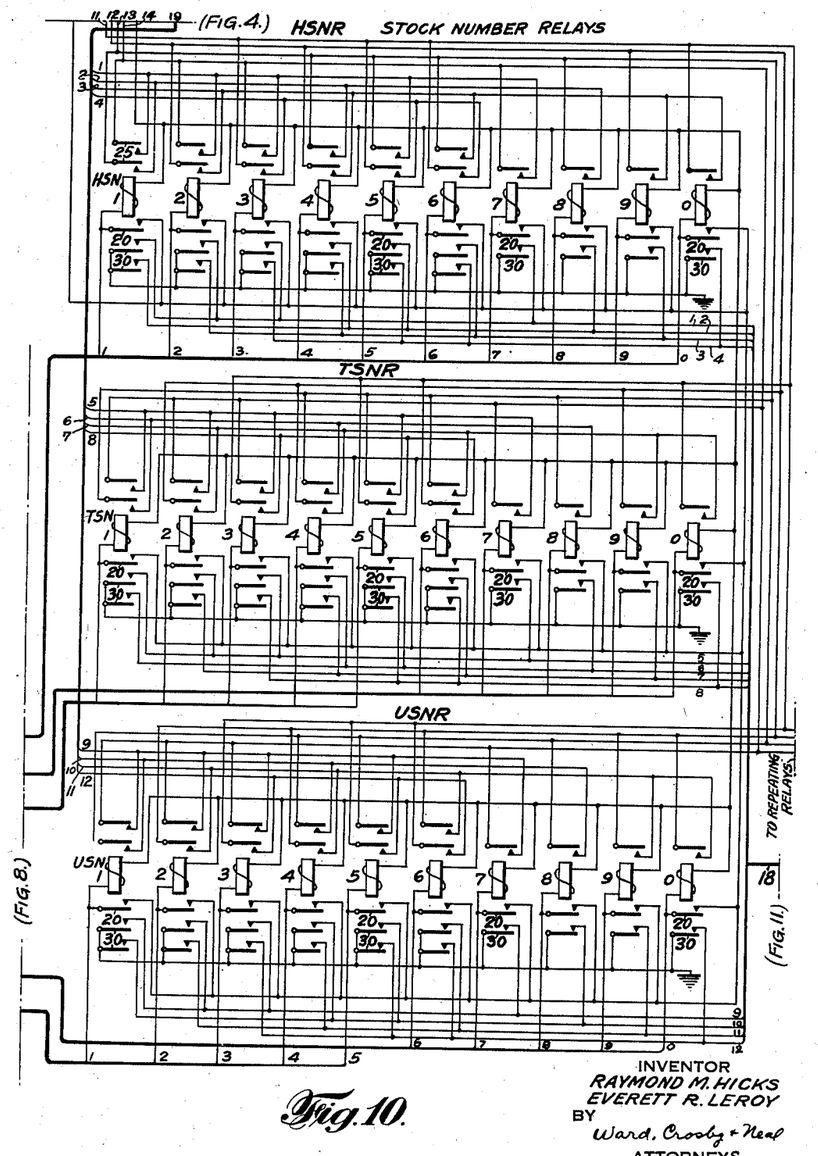
Fig. 10 shows the hundreds, tens and units stock number relays.

As the brush TB1 moves over the tens stock number segments TSN—1, TSN—2, TSN—3 and TSN—4, ground is applied to the lines 5, 6, 7, and 8 of the cable 19, and as the relay 5 of the tens stock number group TSNR, Fig. 10, is operated, ground on lines 5 and 8 will be extended across the contacts of relay 5 to lines 13 and 11 causing the ground pulses to energize repeating relays in like combination.

As the brush moves over the units stock number segments USN—1, USN—2, USN—3 and

USN—4, ground is applied to the lines 9, 10, 11, and 12 in cable 19 which in Fig. 10 are extended across the operated contacts of energized relay 3 in the units stock number group USNR to the lines 14 and 11.

As the brush moves over the segment ST of the ring I, immediately after the stock number has been transmitted, it causes the relay SNL, Fig. 4, to pick up and to lock over its own contact and the contact of relay FL, to ground. This relay also connects the lines 11, 12, 13 and 14 to the lines 5, 6, 7 and 8 which extend to the contacts 23 and 24 of the range and price relays, Fig. 3.

As the brush continues its movement it grounds the range segments R—1, R—2, R—3 and R—4 which are connected across the contacts 23 and 24 of the range relays in Fig. 3 to the lines 5, 6, 7 and 8 which, as stated before, are connected across the contacts of the relay SNL, Fig. 4, to the lines 11, 12, 13 and 14 which extend to the repeating relays, causing a four unit code to be transmitted over the four lines to represent the range.

Immediately after this transmission has taken place the brush TB1 grounds the segment RL of the ring I, Fig. 4, which operates the relay RL, Fig. 4, which in turn removes ground from all the stock number relays and from the range relays in Fig. 3, so that these sets of relays will be de-energized and be in condition to receive information as to the next stock transmitted.

As the brush moves over the segments T—1, T—2, T—3 and T—4 it will apply ground across these segments and across the contacts of the relays T in Fig. 3 to the lines 5, 6, 7, and 8, and across the contacts of the relay SNL, Fig. 4, to the lines 11, 12, 13, and 14 which will cause the repeating relays to transmit a four unit code representing the tens price over the four line wires.

Immediately after transmission of the tens price the segment TL of the ring I will be grounded by the brush TB1, which will cause the relay TL to pick up and to remove ground from the holding circuit of the relays T in Fig. 3, causing these relays to release.

In a like manner, ground over the segments U—1, U—2, U—3 and U—4 will cause ground to be applied across the contacts of the relays U, Fig. 3, causing the repeating relays to send out a four unit code representing the units price over the four wires.

Immediately thereafter the grounding of the segment UL of the ring I will cause the operation of the relay UL, which removes ground from the holding circuit of the relays U in Fig. 3, causing these relays to release.

When ground is applied across the segments F—2, F—3 and F—4, this ground will be extended across contacts of the relays F, Fig. 3, to the lines 6, 7, and 8, and thence to the lines 12, 13, and 14 to operate the repeating relays to send out a four unit code representative of the fractions price. If no range is set up, ground will be connected over contacts 24 of relays Ra to line 8, in the case of no tens, units and/or fractions prices, ground will be connected over contacts 24 of relays T, U and F to line 5, the ground for the fractions coming from segment F—1 of ring E. The receiver (not shown) has no distributor for maintaining synchronism and simply counts the line pulses in operation. The failure to receive the pulses for any particular item would, therefore, throw the receiver out of synchronism. It is for this reason that the range relays are adapted to send a fictitious code for the range item, when this item is not received over the line wire.

Immediately thereafter ground over the segment FL of the ring I will operate the relay FL, Fig. 4, which removes ground from the holding circuit of the fractions relays F, Fig. 3, causing these relays to release and which also removes ground from the holding relay SNL, Fig. 4, causing this relay to release and to disconnect the lines 5, 6, 7, and 8 from the lines 11, 12, 13, and 14.

As shown in Fig. 3, the starting magnet for the distributor TD1 will be energized over the segment TDS of the ring D to start transmission over the four wire transmitter TD1, immediately after the circuits have been made through the various decoding, controlling and stock letter relays, and the stock number relays by ground over segment BF of said ring.

*One wire four unit code transmitter*

Figure 11:
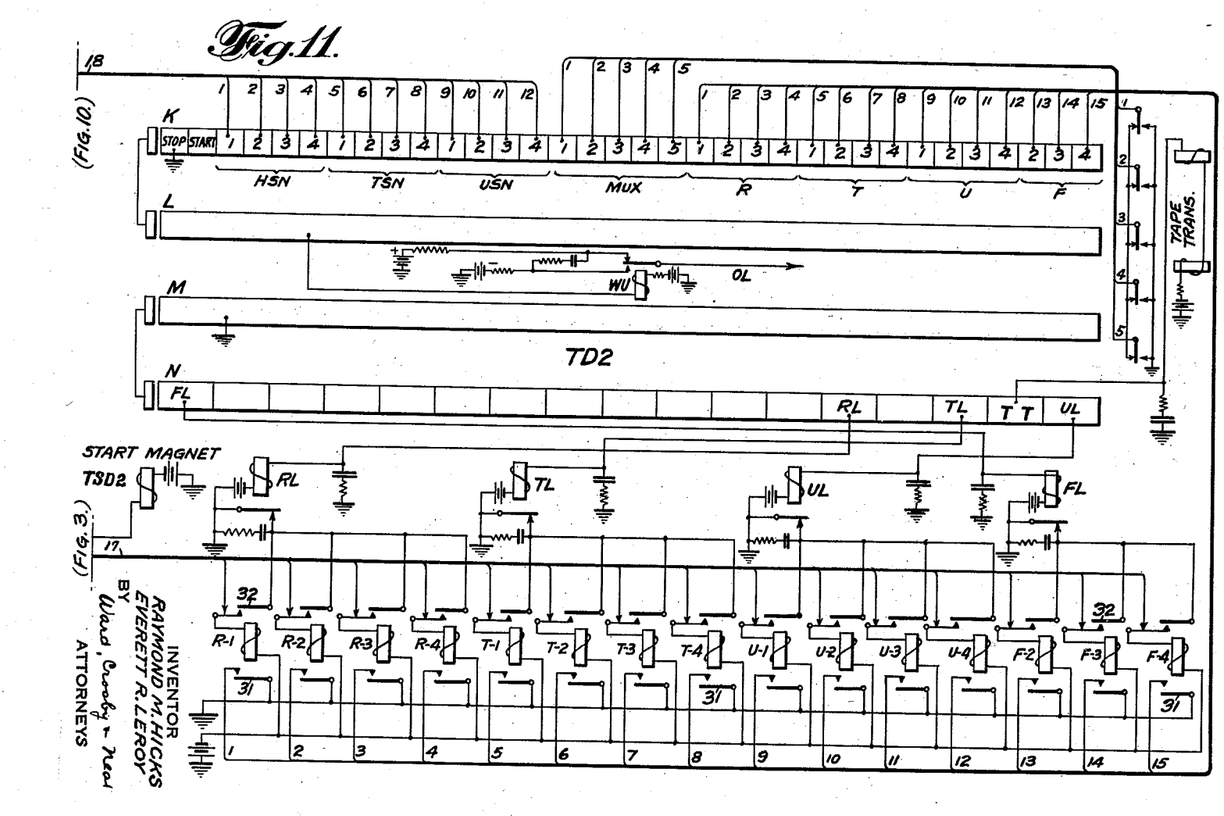
Fig. 11 shows the one wire four unit code transmitting distributor and the auxiliary range and price storage relays, together with miscellaneous control relays and local rings on the distributor, and a tape transmitter shown schematically which may be used for various sub-channel purposes.

This transmitter TD2 is shown developed in a plane in Fig. 11, and is released for operation, at the same time that the four wire four unit code transmitter is released, by ground over the segment TDS of the receiving transmitter, as before described. This transmitter comprises four rings, K, L, M and N, of which the ring K comprises a stop segment normally grounded, a start segment, four hundreds stock number segments, four tens stock number segments, four units stock number segments, five MUX (multiplex) segments, four range segments, four tens segments, four units segments, and three fractions segments. The ring L is connected to one side of the winding of a relay WU so that this relay will operate whenever ground is connected across the various segments of the ring K to the ring L. This relay applies positive and negative battery to the outgoing line OL, which may operate any suitable receiving device such as a stock quotation board, or the like.

The various stock number segments of the ring K, which are cabled at 18, are connected across operated contacts 30 of the hundreds, tens and units stock number relays, Fig. 10, to ground so that as the brush of the distributor in Fig. 11 is rotated it will transmit the code of the hundreds stock number as it moves over the hundreds stock number segments, that of the tens stock number as it moves over the tens stock number segments, and that of the units stock number as it moves over the units stock number segments, causing the relay WU connected to the ring L to operate whenever any one of the lines connected to the segments is grounded over the stock number relays in Fig. 10.

In tracing the circuits across the stock number relays, Fig. 10, in connection with a four wire transmission, it is assumed that the relay 3 of the hundreds stock number group and the relay 5 of the tens stock number group and the relay 3 of the units stock number group were pulled up in response to the translation of stock A. In tracing the circuits for the one wire transmission, it is assumed that these relays have been operated. The operation of the relay 3 in the hundreds stock number group applies ground to lines 1 and 4 in cable 18, which grounds the hundreds stock number segments 1 and 4 of the ring K. The relay 5 in the tens stock number group grounds lines 6 and 8 of cable 18, which are connected to the tens stock number segments 2 and 4, Fig. 11. The relay 3 of the units stock number group applies ground to the lines 9 and 12 of cable 18, which are connected to the units stock number segments 1 and 4 of ring K, Fig. 11. As the brush cooperating with the rings K and L passes over the hundreds, tens and units stock number segments the relay WU will be operated in response to the grounded segments of ring K.

As the brush leaves the units stock number segments it moves into contact with the MUX (multiplex) segments on which ground is applied in various combinations under control of a tape, indicated as tape trans., which may be of any suitable form, for example, as shown in the patent to Benjamin, No. 1,298,440, issued March 25, 1919. As will be seen from Fig. 11 of the drawings, the tape transmitter is caused to move one step ahead when the brush of distributor TD2 passes over segment TT of the ring N, which distributor is controlled by the start magnet TSD2. It will be understood that if no message is stored in the tape transmitter it is prevented from stepping ahead when the distributor brush rotates. The additional MUX signals may comprise instructions to operators or attendants at stations throughout the system, or may comprise additional quotations or other information in regard to stocks or other items of interest to subscribers of stock quotation service, or may be employed for general telegraph service in a stock quotation system. The signals may be utilized to operate a multiplex printer in a manner well known in the art, for example, as shown in the patent to Kleinschmidt, No. 1,564,422, issued Dec. 8, 1925, or may be used to operate any other suitable receiving device, depending upon the particular type of information transmitted. By thus interspersing additional intelligence signals with the quotation signals, the capacity of the system for disseminating information is enlarged and a new function is added to a stock quotation board system.

As the brush continues its movement it moves over the range, tens, units and fractions segments connecting these segments to the ring L, which segments are grounded over the lines 1 to 15 and contacts 31 of the range, tens, units and fractions price relays indicated respectively by R—1 to R—4, T—1 to T—4, U—1 to U—4, and F—2 to F—4, the associated numerals corresponding to the numerals on the segments of the ring F. The range relays R—1, R—2, R—3 and R—4 were picked up directly from ground over the corresponding segments of the receiving distributor ring B, Fig. 3, and locked over their own make before break contacts 32, and the contact of relay RL, Fig. 11, to ground. The make before break contacts make it possible for the relays in Fig. 3 to be released before the relays in Fig. 11 are released.

In the same manner, the relays T—1 to T—4 picked up and locked over the contact of the relay TL to ground. In a like manner, the units relays and the fractions relays picked up and locked respectively over the contacts of the relays UL and FL, to ground. These relays are released as the brush moves over the segments of the ring N bearing a similar designation.

Channeling mechanism

When the brush of the receiving distributor RD, Figs. 2 and 3, and the brush of the four wire four unit code transmitting distributor TD1, are in their home position, as indicated in Figs. 2 and 4, ground over the segment TDR of the ring I, Fig. 4, holds the relay TDR operated, and ground over the segment RDR of the ring D, Fig. 2, is continued across the operated contact 40 of the relay TDR, Fig. 4, to one side of the winding of the phasing relay PH, holding this relay operated. Whenever the relay PH is energized, the next transmission will be a channel 1 operation.

During the operation of the mechanism the distributor brush RB, Fig. 2, is released removing ground from the winding of the relay PH, causing this relay to release. As the distributor brush RB moves over the segment TDS, which releases the distributor brush TB1, Fig. 4, the brush TB1 moves off the segment TDR of the ring I, thus releasing the relay TDR. As the brush TB1 continues its movement it grounds the segments of the rings E, F, and G, causing ground to be applied to the lines 14, 13, and 12 which operate the repeating relays, sending pulses out over three of the four wires, the combinations of pulses sent out over these wires having the effect in the receiving station, not shown, of routing the stock information to receiving and indicating devices of channel 1. Ground on the channel segment of the ring H during this operation has no effect as the relay CH is deenergized.

When the receiving distributor brush RB arrives at its home position, ground over the segment RDR and the unoperated contact 40 of the relay TDR, the normal contact 41 of the phasing relay PH, the normal contact 42 of relay CS, normal contact 43 of relay CR, causes the relay CH to pick up and to lock over its own contact 44 and a contact 45 of relay PH, contact 46 of relay CR, and winding of relay CS, to ground, so that as the energizing circuit is broken the relay CS will pull up in series with the relay CH.

As the brush TB1 of the four wire four unit code distributor, Fig. 4, arrives at its home position it connects ground to the segment TDR of the ring I, which causes the relay TDR to pick up preparing a circuit to the relay PH. This relay does not operate as ground is not supplied from segment RDR at this time. As the brush moves over the channel segments of the rings E, F, and G, ground is applied to the lines 14, 13, and 12, as before, and ground over the channel segment of the ring H continues over the operated contact 47 of the relay CH to the line 11, causing the associated repeater relay to operate, and transmit an impulse, indicating that this information relates to the other channel. As the brush leaves the segment TDR, relay TDR releases, so that when the brush RB of the receiving distributor reaches its home position and applies ground to the segment RDR, which is extended to the coil of relay CR, over the unoperated contacts 40 and 41 of relays TDR and PH, and the operated contact 42 of relay CS, relay CR is operated. Relay CR opens the circuit for relays CS and CH and locks to the segment RDR during the time this segment is grounded. When ground is removed from the segment RDR, the relays CS and CH have been released and cannot reoperate, so that the next transmission is a channel 1 transmission. The alternate operation continues until both distributors come to rest, at which time both the TDR and the PH relays are operated insuring that the next transmission will be a channel 1 transmission.

The receiver consists of pulse storage devices in duplicate, either group of which may be selectively operated by means of a preliminary channeling pulse for effecting such selection. In normal operation this selection is made alternately after a sufficient rest period and will again start on a predetermined channel which in this case is always channel 1.

While the invention has been described with certain particularity as to one preferred embodiment of a combination of mechanisms, it is to be understood that this has been done for purposes of illustration and that various changes and substitutions may readily be apparent to those skilled in the art after understanding the invention herein disclosed. The words employed in the claims are, therefore, words of description and not of limitation.

What we claim is:

1. The combination with a receiving distributor, a plurality of letter storage relays to which letter signals received over a single line channel in coded time relationship are allocated by said distributor, a recoding mechanism for converting said coded letter signals into coded digit signals, a retransmitting distributor under control of said mechanism for transmitting said coded digit signals over a single line channel in coded time relationship, a plurality of other line channels, and another retransmitting distributor also under control of said mechanism for allocating said coded digit signals to different ones of said other line channels.

2. The combination with a plurality of storage devices, of a distributor for allocating incoming signals received in coded time relationship over a single line channel to said storage devices, means for converting said incoming coded signals into a different code involving a certain number of units, a single line channel and a plurality of other line channels, and means under control of said converting means for retransmitting said latter code over said single line channel by means of impulses in coded time relationship and over said other channels by means of signals allocated to different ones of the channels, the number of said other channels being equal to the number of units in the code into which the incoming coded signals have been converted.

3. The combination with a single line channel, of two sets of signal storage devices, a distributor for simultaneously allocating signals comprising pulses received in coded time relationship over said line channel to the corresponding storage devices in each set, a plurality of retransmitting channels, a retransmitting distributor operable under control of one of said sets of signal storage devices for allocating the various pulses of each signal retransmitted to different ones of said plurality of retransmitting channels, a single retransmitting channel, and a distributor operable under control of the other set of storage devices for allocating the various pulses of each signal retransmitted in coded time relationship to said single retransmitting line channel.

4. The combination with a single line channel, of two sets of storage relays, a distributor for simultaneously allocating pulses received in coded time relationship over said line channel to the corresponding storage relays in each set, a plurality of retransmitting channels, a retransmitting distributor operable under control of one of said sets of storage relays for allocating the various pulses of each signal retransmitted to different ones of said plurality of retransmitting channels, a single retransmitting channel, and a distributor operable under control of the other set of storage relays for allocating the various pulses of each signal retransmitted in coded time relationship to said single retransmitting channel.

5. The combination with a single line channel, of two sets of storage relays, a distributor for simultaneously allocating impulses received in coded time relationship over said line channel to the corresponding storage relays in each set, a plurality of retransmitting channels, a distributor operable under control of one of said sets of storage relays for allocating the various pulses of each signal retransmitted to different ones of said plurality of retransmitting channels, a single retransmitting channel, a distributor operable under control of the other set of storage relays for allocating the various pulses of each signal retransmitted in coded time relationship to said single retransmitting channel, separate holding circuits for each set of storage relays, and means associated with said distributors for opening the holding circuits of the associated set of storage relays at the proper time during a retransmission operation.

6. In an apparatus of the character described, the combination of mechanism for receiving and storing impulses corresponding to a stock designation, said mechanism including groups of storage relays, a single line channel, a distributor for successively closing circuits over certain contacts of each group of storage relays in response to impulses received in coded time relationship over said single line channel, a plurality of retransmitting channels, and a distributor for simultaneously closing circuits over other contacts of each group of storage relays to allocate the various pulses of each signal retransmitted to different ones of said plurality of retransmitting channels, each distributor closing circuits over contacts of the several groups in succession.

7. In an apparatus of the character described including a plurality of groups of letter storage relays, a plurality of groups of digit storage relays, a receiving distributor for allocating a five unit letter code comprising impulses received over a channel in coded time relationship to said letter storage relays and a four unit digit code comprising impulses received over a channel in coded time relationship to said digit storage relays, a decoding mechanism operable under control of said letter storage relays for converting the letters into digits represented by a four unit code, a distributor operable under control of said decoding mechanism and said storage relays for transmitting a four unit digit signal comprising impulses in coded time relationship over a single channel, said transmitting distributor including means for transmitting special information comprising impulses in coded time relationship over said single channel, and means for controlling the transmission of said special information.

8. In a stop-start system, means including a stop-start transmitting distributor having elements operable during each cycle of operation of the distributor for successively transmitting a plurality of permutation code signals comprising a message, and means including other elements of said distributor operable during each of said cycles of operation of the distributor for transmitting a permutation code signal corresponding to a character of another message.

9. In a quotation system, a rotary distributor having elements operative during each revolution of the distributor for transmitting signals comprising at least one complete quotation, and means including other elements of said distributor for transmitting a multiplex signal comprising a portion of another message during a portion of each revolution of the distributor.

10. In a quotation system, a rotary distributor having a plurality of groups of segments for transmitting signals representative of a complete quotation during each revolution of the distributor, and means including other segments on said distributor for transmitting additional intelligence signals interspersed with said quotation signals during successive revolutions of the distributor.

11. In combination, a plurality of storage relays for storing signals representative of a quotation to be transmitted, a distributor having transmitting segments respectively associated with said relays, a plurality of storage devices for storing multiplex signals, multiplex transmitting segments on said distributor respectively associated with the multiplex storage devices, means including said transmitting segments for successively applying said stored quotation signals to an outgoing line and for interspersing the stored multiplex signals with the quotation signals transmitted, and means automatically operative after the signals have been transmitted for restoring said relays and devices to a receptive condition for receiving and storing subsequent signals.

12. The combination with a single line channel, of a plurality of signal storage devices, a receiving distributor for allocating to said storage devices signals comprising impulses received in coded time relationship over said single line channel, a plurality of retransmitting line channels, a retransmitting distributor operable under control of said storage devices for allocating the various impulses of each signal retransmitted to different ones of said plurality of retransmitting line channels, a single retransmitting line channel, and a retransmitting distributor operable under control of said storage devices for allocating the various impulses of each signal retransmitted in coded time relationship to said single retransmitting line channel.

13. The combination with an incoming line channel, of a plurality of signal storage devices, a receiving distributor for allocating to said storage devices signals comprising impulses received in coded time relationship over said incoming line channel, a group of associated retransmitting line channels and another retransmitting line channel, retransmitting distributor structure for allocating the various impulses of the signals stored on said storage devices to different ones of said group of retransmitting line channels, and for allocating the various impulses of said stored signals in coded time relationship to said another retransmitting line channel.

RAYMOND M. HICKS.
EVERETT R. LEROY.